United States Patent
Ryu et al.

(10) Patent No.: US 11,586,247 B2
(45) Date of Patent: Feb. 21, 2023

(54) FLEXIBLE DISPLAY

(71) Applicant: Samsung Display Co., Ltd., Yongin-si (KR)

(72) Inventors: An Na Ryu, Hwaseong-si (KR); Mu Gyeom Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 160 days.

(21) Appl. No.: 16/138,844

(22) Filed: Sep. 21, 2018

(65) Prior Publication Data

US 2019/0025886 A1 Jan. 24, 2019

Related U.S. Application Data

(62) Division of application No. 14/961,571, filed on Dec. 7, 2015, now abandoned.

(30) Foreign Application Priority Data

Mar. 31, 2015 (KR) .................. 10-2015-0045315

(51) Int. Cl.
*G06F 1/16* (2006.01)
*B32B 3/30* (2006.01)
*G02F 1/1333* (2006.01)

(52) U.S. Cl.
CPC .......... *G06F 1/1641* (2013.01); *G06F 1/1652* (2013.01); *B32B 3/30* (2013.01); *B32B 2457/20* (2013.01); *B32B 2457/202* (2013.01); *B32B 2457/206* (2013.01); *C09K 2323/05* (2020.08); *C09K 2323/051* (2020.08); *G02F 1/133305* (2013.01)

(58) Field of Classification Search
CPC ....... G06F 1/1641; G06F 1/1652; B32B 3/30; B32B 2457/20; B32B 2457/202; B32B 2457/206; Y10T 428/1059; G09F 9/301; C09K 2323/05; C09K 2323/051; G02F 1/133305
See application file for complete search history.

(56) References Cited

U.S. PATENT DOCUMENTS

| | | | |
|---|---|---|---|
| 7,710,370 B2 | 5/2010 | Slikkerveer et al. | |
| 9,990,004 B2 | 6/2018 | Xiong | |
| 2013/0034685 A1 | 2/2013 | An | |
| 2014/0029212 A1* | 1/2014 | Hwang | G09F 9/301 361/749 |
| 2014/0065326 A1* | 3/2014 | Lee | G09F 9/301 428/12 |

(Continued)

FOREIGN PATENT DOCUMENTS

| | | |
|---|---|---|
| CN | 102916033 A | 2/2013 |
| CN | 103390613 A | 11/2013 |

(Continued)

*Primary Examiner* — Eli D. Strah
(74) *Attorney, Agent, or Firm* — Lewis Roca Rothgerber Christie LLP (57) ABSTRACT

A flexible display is disclosed. In one aspect, the flexible display includes a window layer including a bending area and a non-bending area and a flexible display panel formed over a surface of the window layer and configured to display images. The bending area includes a plurality of cut portions which are configured to be at least partially separated along a plurality of cut lines formed therebetween.

4 Claims, 7 Drawing Sheets

(56) References Cited

U.S. PATENT DOCUMENTS

| | | | |
|---|---|---|---|
| 2014/0287213 A1* | 9/2014 | Lee | B32B 5/142 |
| | | | 428/217 |
| 2014/0292650 A1 | 10/2014 | Xiong | |
| 2015/0043174 A1* | 2/2015 | Han | G06F 1/1626 |
| | | | 361/749 |
| 2015/0055287 A1 | 2/2015 | Seo | |
| 2015/0194618 A1* | 7/2015 | Cheng | H01L 51/5253 |
| | | | 257/40 |
| 2016/0035801 A1* | 2/2016 | Kim | H01L 51/0097 |
| | | | 257/40 |

FOREIGN PATENT DOCUMENTS

| | | |
|---|---|---|
| CN | 103426904 A | 12/2013 |
| CN | 103578356 A | 2/2014 |
| CN | 103824526 A | 5/2014 |
| JP | 2006-507543 A | 3/2006 |
| KR | 10-2014-0015881 A | 2/2014 |
| KR | 10-2014-0026547 A | 3/2014 |
| KR | 10-2014-0033546 A | 3/2014 |
| KR | 10-2014-0085956 A | 7/2014 |
| KR | 10-2014-0108826 A | 9/2014 |
| KR | 10-2014-0115178 A | 9/2014 |
| TW | 201447647 A | 12/2014 |
| WO | WO-2015014036 A1 * 2/2015 | ............. H01L 21/77 |

\* cited by examiner

FLEXIBLE DISPLAY

CROSS-REFERENCE TO RELATED APPLICATIONS

This application is a divisional of and claims priority to and the benefit of U.S. patent application No. 14/961,571, filed Dec. 7, 2015, which claims priority to and the benefit of Korean Patent Application No. 10-2015-0045315 filed in the Korean Intellectual Property Office on Mar. 31, 2015, the entire contents of which are incorporated herein by reference.

BACKGROUND

Field

The described technology generally relates to a flexible display that is capable of preventing damage caused due to bending of the display, and maintaining the optical characteristics even when the display is bent.

Description of the Related Technology

Currently, widely known display devices, each using a unique display technology, include liquid crystal displays (LCDs), plasma display panels (PDPs), organic light-emitting diode (OLED) displays, field effect displays (FEDs), electrophoretic displays (EPDs), and the like. Techniques for forming these types of display devices with flexible material(s) are currently being researched. Since display devices formed with flexible material(s) can be used to develop new devices such as electronic books and electronic paper, these flexible displays are anticipated to be widely used for various applications.

However, since such flexible displays have a structure in which several layers are stacked, stress is not evenly distributed when the displays are bent due to the differences in the elastic coefficients of the materials forming respective layers and the differences in the properties of components contained in each layer. Since stress that is not evenly distributed is concentrated in one area, it may experience premature wear, resulting in damage or complete failure. Accordingly, flexible displays having a structure that more evenly distribute stress when bent is desired.

The above information disclosed in this Background section is only intended to facilitate the understanding of the background of the described technology and therefore it may contain information that does not form the prior art that is already known in this country to a person of ordinary skill in the art.

SUMMARY OF CERTAIN INVENTIVE ASPECTS

One inventive aspect is a flexible display that is capable of preventing damage caused due to bending of the display, and maintaining the optical characteristics even when bent.

Further, aspects are not limited to the aforementioned aspects, and other aspects not mentioned herein will be understood by those skilled in the art from the description below.

Another aspect is a flexible display, including a window layer that includes a bent area and a non-bending area and a flexible display panel formed on one surface of the window layer to display an image, wherein the bent area can include a plurality of cut units formed by the window layer being cut into a plurality.

The flexible display can further include a hard coating layer formed on the other surface of the window layer and an adhesive layer interposed between the window layer and the hard coating layer so that one end of the cut unit slips along a surface of the adhesive layer, wherein one end of one of the plurality of cut units can be slipped along the surface of the adhesive layer to be spaced apart from an adjacent one of the plurality of the cut units.

The flexible display panel can include a display area including a pixel from which light is emitted to display an image, and a non-display area in which light is blocked not to display an image, wherein the non-bending area can be formed at a position corresponding to the display area, and the bent area can be formed at a position corresponding to the non-display area.

Another aspect is a flexible display, including a window layer that includes a bent area and a non-bending area, and a flexible display panel formed on one surface of the window layer and including an emission area where light emitted from a unit pixel passes through to display an image, wherein the bent area can be formed by partially removing the window layer.

The bent area can include a plurality of protrusions formed by partially removing the window layer to have a larger cross-section than that of the emission area at a position corresponding to the emission area, and a bent area filling portion that fills the bent area so that a height of the bent area is equal to a surface of the window layer.

The bent area filling portion can be made with transparent synthetic resins or glass.

The flexible display can further include a hard coating layer formed with the same material as the bent area filling portion, and can be formed on the other surface of the window layer.

The bent area can include a plurality of grooves formed by partially removing the window layer corresponding to the emission area to have a larger cross-section than that of the emission area while corresponding to a shape of the emission area.

The flexible display can further include a hard coating layer formed on the other surface of the window layer and formed with transparent synthetic resins or glass.

The grooves can be filled with the same material as the hard coating layer.

Another aspect is a flexible display comprising a window layer including a bending area and a non-bending area; and a flexible display panel formed over a surface of the window layer and configured to display images, wherein the bending area includes a plurality of cut portions which are configured to be at least partially separated along a plurality of cut lines formed therebetween.

In exemplary embodiments, the flexible display further comprises a hard coating layer formed over another surface of the window layer so as to oppose the flexible display panel; and an adhesive layer interposed between the window layer and the hard coating layer, wherein an end of each of the cut portions is configured to slip along a surface of the adhesive layer as the flexible display is bent. The ends of the cut portions can be further configured to slip along the surface of the adhesive layer so as to be spaced apart from each other.

In exemplary embodiments, flexible display panel can include a display area including at least one pixel configured to emit light so as to display an image; and a non-display area, wherein the non-bending area is arranged at a position corresponding to the display area, and wherein the bent area is arranged at a position corresponding to the non-display area. The cut portions can be directly connected along the surface of the flexible display panel.

Another aspect is a flexible display, comprising a window layer including a bending area and a non-bending area; and a flexible display panel formed over a surface of the window layer and including a plurality of emission areas configured to emit light to display an image, wherein at least a portion of the window layer is removed from the bent area.

In exemplary embodiments, the bent area includes a plurality of protrusions, each having a greater cross-section than that of the emission area, wherein the protrusions are arranged at positions corresponding to the emission areas; and a filler formed over the protrusions such that the height of the bending area is substantially equal to that of the window layer. The filler can comprise transparent synthetic resins or glass. The flexible display can further comprise a hard coating layer formed of the same material as the filler and formed over another surface of the window layer so as to oppose the flexible display panel.

In exemplary embodiments, the bent area includes a plurality of grooves arranged at positions corresponding to the emission areas, wherein each of the grooves has a cross-section that is greater than that of the emission areas. The flexible display can further comprise a hard coating layer formed on another surface of the window layer so as to oppose the flexible display panel, wherein the hard coating layer is formed of transparent synthetic resins or glass. A filler comprising the same material as the hard coating layer can fill in the grooves.

According to at least one embodiment, even though a flexible display is bent, since stress due to the bending can be properly dispersed, it is possible to prevent the flexible display from being damaged and to maintain the optical characteristics thereof when bent.

DETAILED DESCRIPTION OF CERTAIN INVENTIVE EMBODIMENTS

Hereinafter, exemplary embodiments will be described in detail with reference to the accompanying drawings. However, in describing the embodiments, a description of known functions or configurations will be omitted such that the description of the subject matter is clear.

The drawings and description are to be regarded as illustrative in nature and not restrictive. Like reference numerals designate like elements throughout the specification. In addition, the size and thickness of each component shown in the drawings may be exaggerated for the sake of clarity and ease of description, but the described technology is not limited thereto.

It will be understood that when an element such as a layer, film, region, or substrate is referred to as being "on" another element, it can be directly on the other element or intervening elements may also be present.

Figure 1:
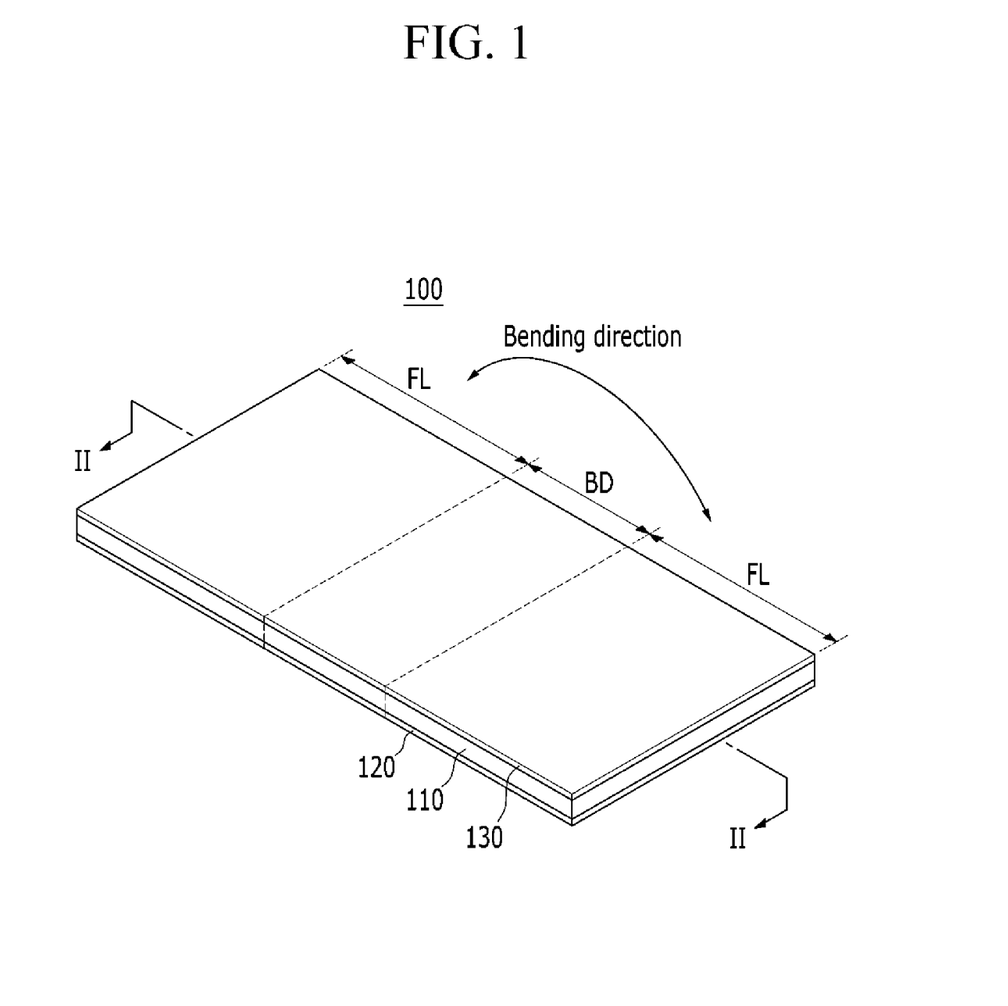
FIG. 1 is a perspective view of a flexible display according to an exemplary embodiment.
Figure 2:
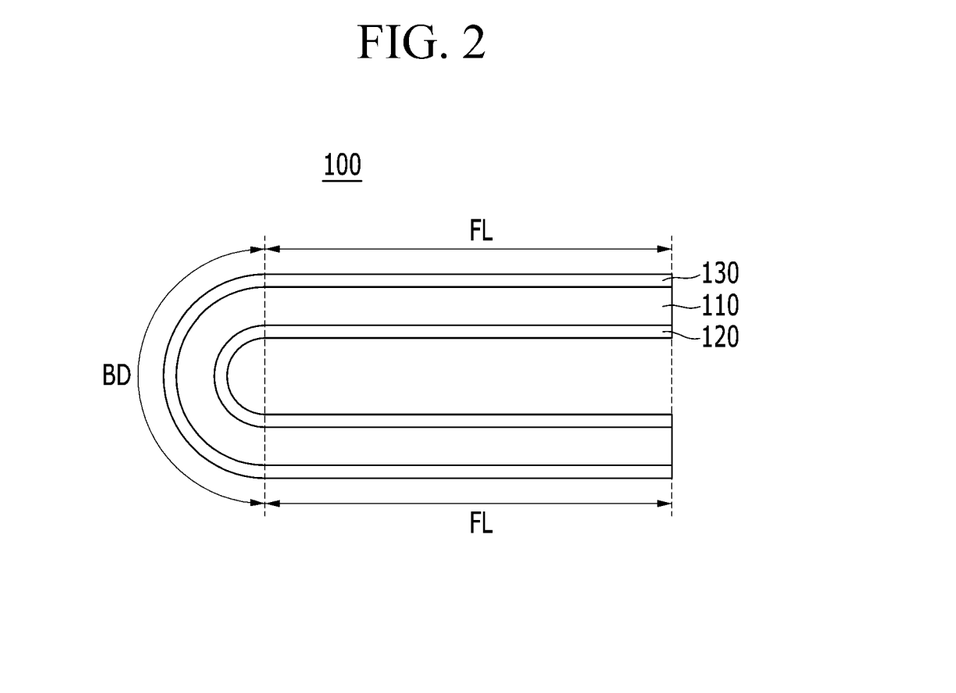
FIG. 2 is a drawing illustrating a configuration in which the flexible display of FIG. 1 is bent.

FIG. 1 is a perspective view of a flexible display according to an exemplary embodiment. FIG. 2 is a drawing illustrating a configuration in which the flexible display of FIG. 1 is bent.

As shown FIGS. 1 and 2, the flexible display 100 according to an exemplary embodiment includes a window layer 110, a flexible display panel 120, and a hard coating layer 130. In the flexible display 100 according to the present exemplary embodiment, the window layer 110 is formed on the outermost side of the flexible display 100 to block and protect the interior thereof.

Since the flexible display 100 can be bent, the window layer 110 according to the present exemplary embodiment can be formed of a flexible material to be bent together with the flexible display 100. Further, the window layer 110 can be formed of an electrically insulating material to electrically insulate the interior of the flexible display 100. The window layer 110 can be formed of a transparent material to allow light generated from the flexible display panel 120 to be emitted the exterior of the flexible display 100. More specifically, the window layer 110 according to the present exemplary embodiment can be formed of a material such glass and/or plastic, but it is not limited thereto, and any material having such aforementioned characteristics can be used as a material for forming the window layer 110 of the present exemplary embodiment.

As shown in FIG. 1, the window layer 110 can be divided into a bent area or flexible area (BD) and a non-bending area (FL). However, since the bent area (BD) and the non-bending area (FL) are shown as being divided to illustrate and explain a configuration in which the flexible display 100 shown in FIG. 2 can be bent, they may not be visually different when the flexible display 100 is unfolded. That is, the bent area (BD) and the non-bending area (FL) can be visually indistinguishable to a user of the flexible display 100.

Further, the division between the bent area (BD) and the non-bending area (FL) is not necessarily fixed, and thus the position of the division can vary according to the region at which the flexible display 100 is bent.

As shown in FIG. 2, the bent area (BD) is an area substantially deformed when the flexible display 100 is bent, and the non-bending area (FL) is an area that is not deformed and remains flat even when the flexible display 100 is bent. The flexible display panel 120 can generate light in order to display an image by the flexible display 100 according to the present exemplary embodiment. The flexible display panel can be formed on one surface of the window layer 110 according to the present exemplary embodiment.

The flexible display panel 120 of the present exemplary embodiment can employ any one of various display techniques, such as a liquid crystal display (LCD) panel, a plasma display panel (PDP), an organic light-emitting diode (OLED) display panel, or the like, according to the structure and light generation technique, but it is not limited thereto. In addition, the flexible display panel 120 of the present exemplary embodiment can be formed of a flexible material such as plastic to be easily bent.

The hard coating layer 130 is formed on the window layer 110 to protect the window layer 110 according to the present exemplary embodiment. Therefore, as shown in FIG. 1, the flexible display panel 120 can be formed on the one surface of the window layer 110, and the hard coating layer 130 can be formed on an opposing surface of the window layer 110. The hard coating layer 130 is illustrated in FIGS. 1 and 2, but it may be omitted in some embodiments. The hard coating layer 130 can also be formed of a flexible material so that the flexible display 100 of the present exemplary embodiment can be smoothly or easily bent and unfolded.

The bent area (BD) and the non-bending area (FL) formed on the window layer 110 can be formed to have a discontinuous structure. The term "discontinuous structure" generally means that the arrangement or configuration of the bent and non-bending areas (BD) and (FL) are different from each other. Therefore, the bent area (BD) and the non-bending area (FL) can be different from each other in their arrangement and/or configuration, and they can vary according to the position at which the flexible display 100 is bent, as described above.

Figure 3:
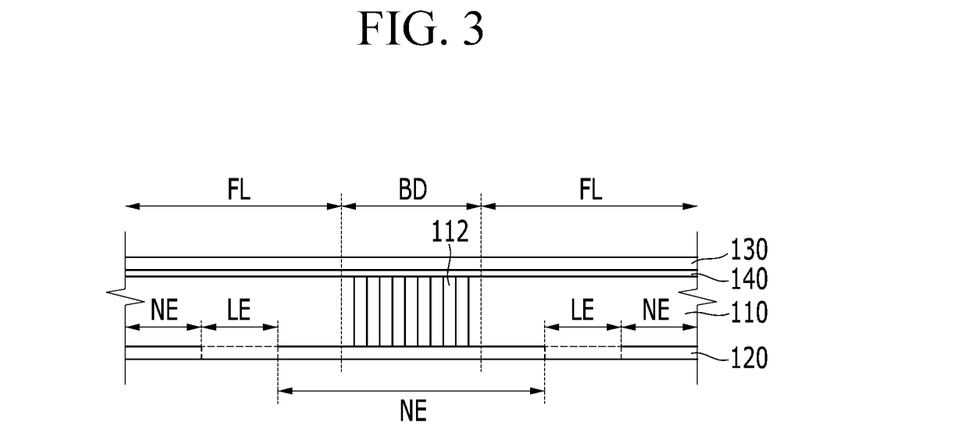
FIG. 3 is a partial cross-sectional view of a flexible display according to a first exemplary embodiment taken along line II-II of FIG. 1.
Figure 4:
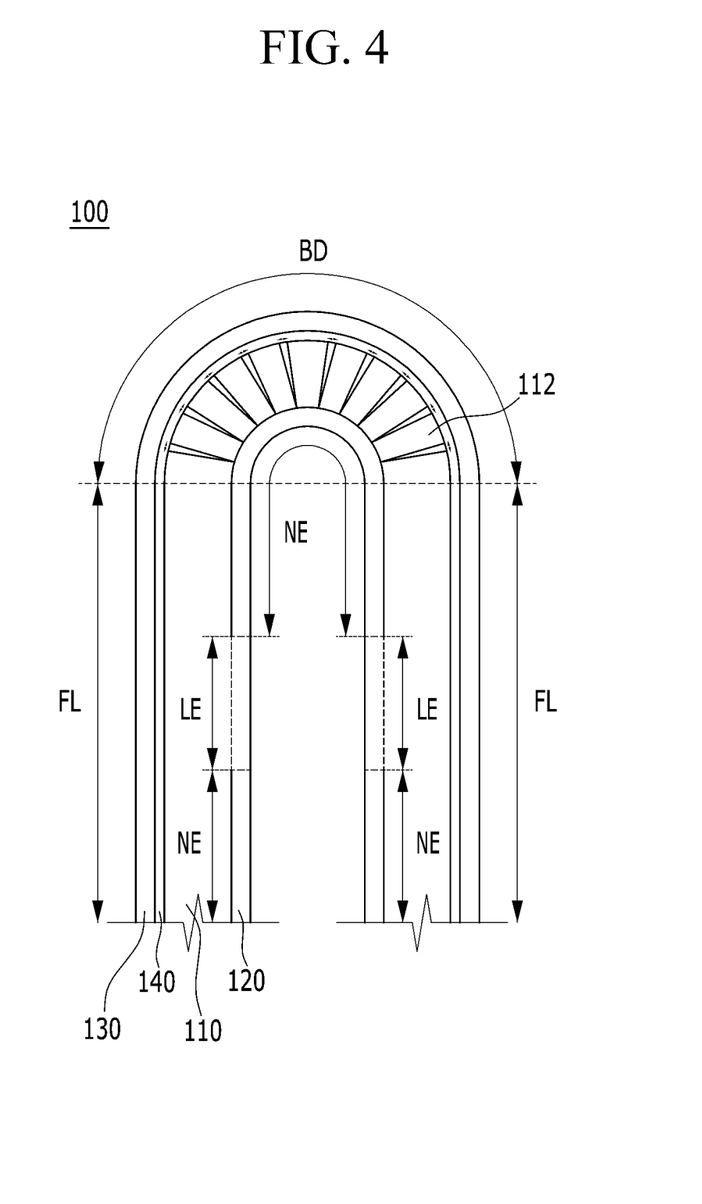
FIG. 4 is a drawing illustrating a configuration in which the flexible display of FIG. 3 is bent.
Figure 5:
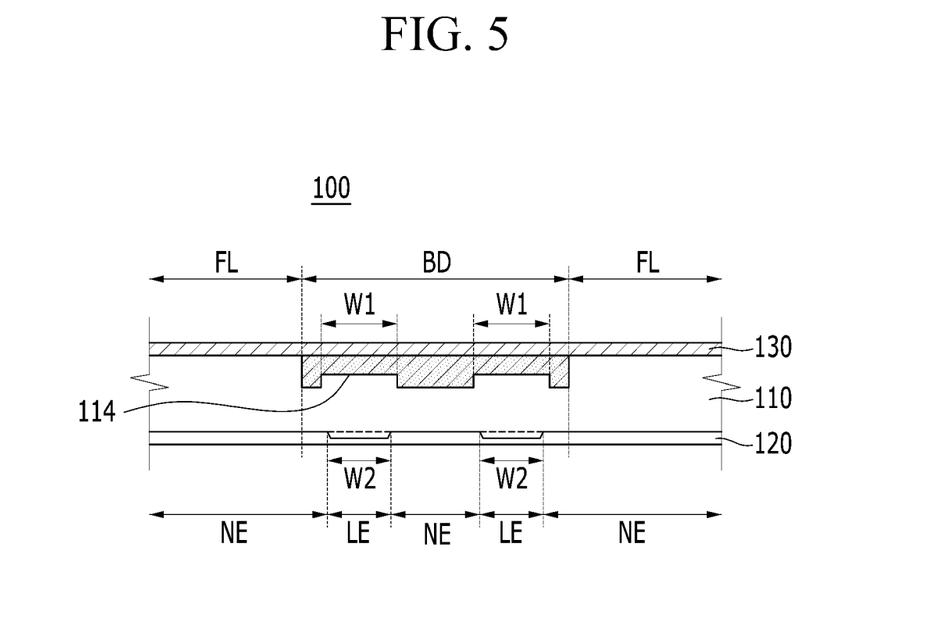
FIG. 5 is a partial cross-sectional view of a flexible display according to a second exemplary embodiment taken along line II-II of FIG. 1.
Figure 6:
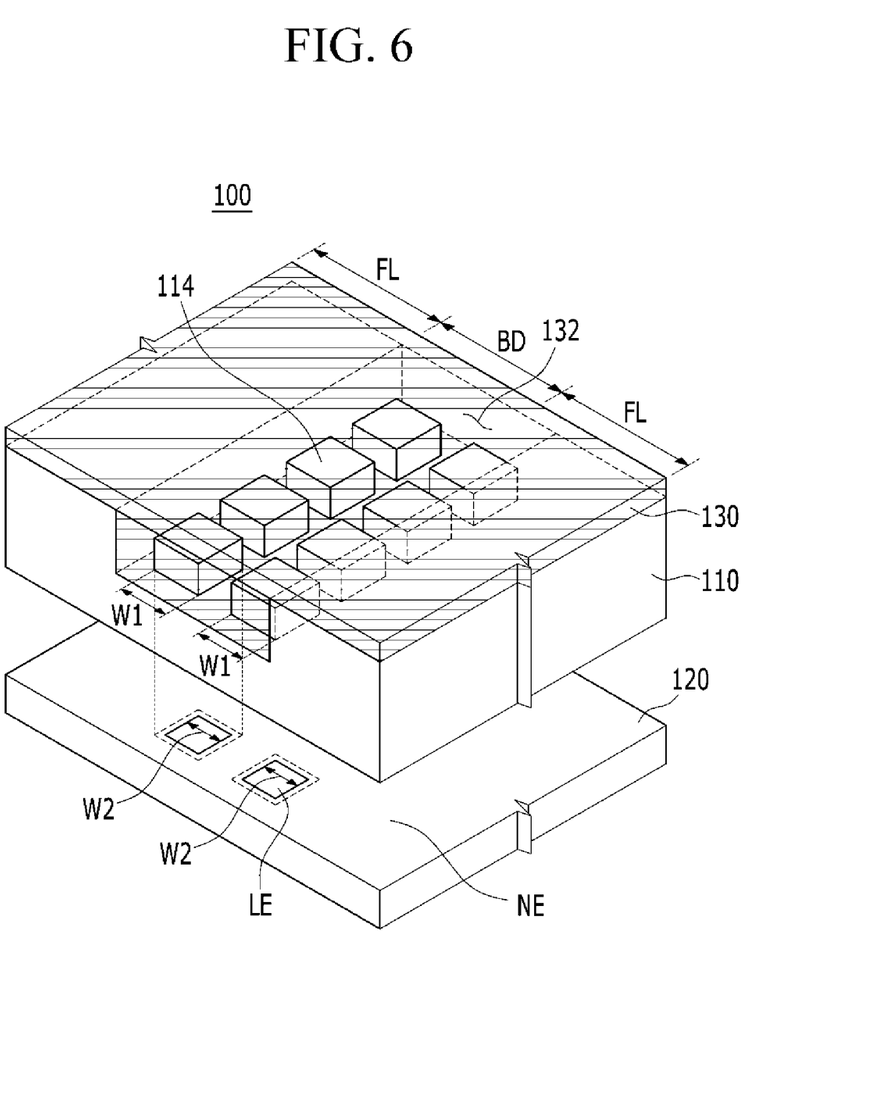
FIG. 6 is a drawing illustrating a configuration of the flexible display of FIG. 5.
Figure 7:
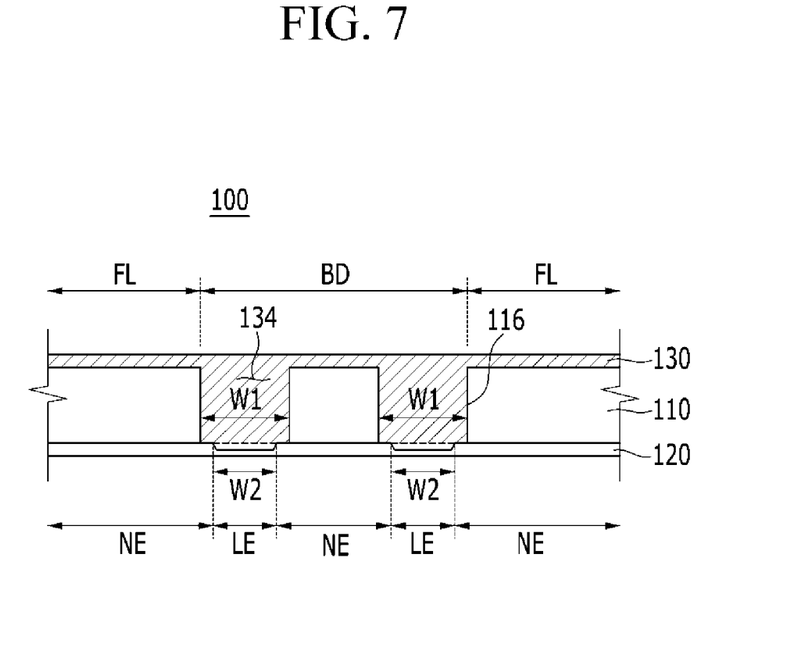
FIG. 7 is a partial cross-sectional view of a flexible display according to a third exemplary embodiment taken along line II-II of FIG. 1.
Figure 8:
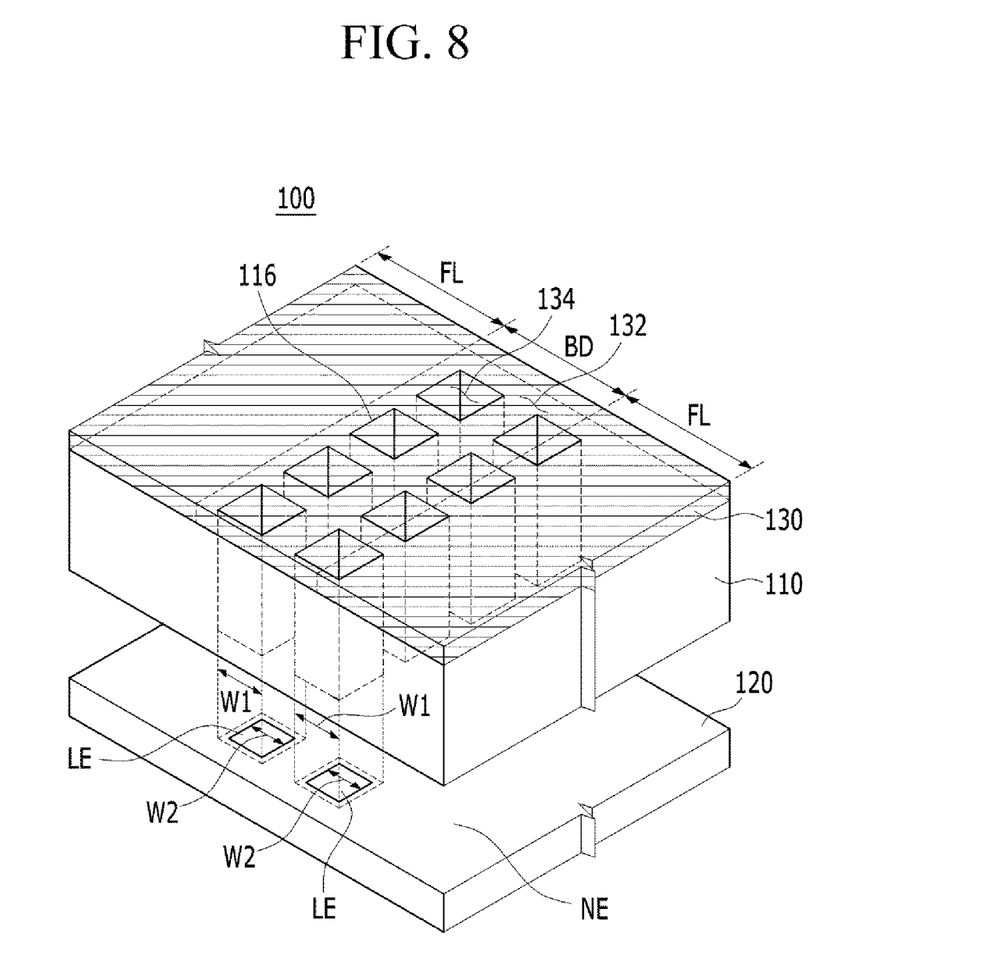
FIG. 8 is a drawing illustrating a configuration of the flexible display of FIG. 7.

A detailed structural difference between the bent area (BD) and the non-bending area (FL) according to first to third exemplary embodiments will be described in detail with reference to FIGS. 3 to 8. FIG. 3 is a partial cross-sectional view of a flexible display 100 according to a first exemplary embodiment taken along line II-II of FIG. 1. FIG. 4 is a drawing illustrating a configuration in which the flexible display 100 of FIG. 3 is bent. FIG. 5 is a partial cross-sectional view of a flexible display 100 according to a second exemplary embodiment taken along line II-II of FIG. 1. FIG. 6 is a drawing illustrating a configuration of the flexible display 100 of FIG. 5. FIG. 7 is a partial cross-sectional view of a flexible display 100 according to a third exemplary embodiment taken along line II-II of FIG. 1. FIG. 8 is a drawing illustrating a configuration of the flexible display 100 of FIG. 7.

The first exemplary embodiment will now be described in detail with reference to FIGS. 3 and 4. As shown in FIGS. 3 and 4, the flexible display 100 according to the first exemplary embodiment includes a plurality of cut units or cut portions 112 formed by some or all of the window layer 110 corresponding to the bent area (BD) being cut. The cut units 112 are formed by some or all of the window layer 110 being cut so that when the flexible display 100 is bent, the cut units 112 are arranged to be spaced apart from each other so that stress generated due to the flexible display 100 being bent can be distributed. Further, when the flexible display 100 is unfolded, the cut units 112 are arranged to be adjacent to each other.

Since the window layer 110 can be divided into two areas for each cut made in the window layer 110, there are a plurality of cut units 112. A laser cutter can be used for cutting the window layer 110 to form the cut units 112, but is not limited thereto, and any cutter that can precisely cut some or the all of the window layer 110 for forming a cut line or a slit in the window layer 110 can be used. The cut units 112 formed by cutting the window layer 110 according the present exemplary embodiment can be cut to be parallel to each other in a direction perpendicular to a surface of the window layer 110 to have a predetermined width along a thickness direction of the window layer 110. However, the present exemplary embodiment is not limited thereto, that is, the scope for implementing the described technology is not limited to a cut structure for easily bending the flexible display 100.

The flexible display 100 according to the present exemplary embodiment described above can include a hard coating layer 130, and can further include an adhesive layer 140. The hard coating layer 130 is formed on the a surface of the window layer 110, and the adhesive layer 140 is interposed between the window layer 110 and the hard coating layer 130, and one end portion of the cut units 112 can slip along a surface of the adhesive layer 140.

When the flexible display 100 is bent as shown in FIG. 4, the cut unit 112 is spaced apart from the adjacent cut unit 112 while one end portion of the cut unit 112 slips along the surface of the adhesive layer 140. Accordingly, when the flexible display 100 is bent, as shown in FIG. 4, a plurality of cut units 112 can be arranged in an arc shape. Additionally, the other end portions of the cut units 112 according to the present exemplary embodiment can be fixed to the flexible display panel 120. The other end portions of the cut units 112 fixed to the flexible display panel 120 maintain the original spacing between the adjacent cut units 112 even when the flexible display 100 is bent. Accordingly, refraction or dispersion of light emitted from the flexible display panel 120 can be reduced or prevented.

Further, the flexible display panel 120 includes a plurality of pixels that can emit light, a display area (not shown) in which light emitted from the pixels is emitted to the exterior of the flexible display 100 to display an image, and a non-display area (not shown) in which light is blocked in order to not display an image. Accordingly, the non-bending area (FL) of the present exemplary embodiment can be formed at a position corresponding to the display area, and the bent area (BD) can be formed at a position corresponding to the non-display area. When the bent area (BD) is formed at the position corresponding to the display area, light emitted from the display area can be refracted or dispersed due to the arrangement of the cut units 112 in certain configurations. Further, if the bent area (BD) is arranged at the position corresponding to the display area, problems such as light leakage may occur.

Accordingly, the bent area (BD) according to the present exemplary embodiment can be formed at the position corresponding to the non-display area (NE) to solve the aforementioned problem. Accordingly, the cut units 112 according to the present exemplary embodiment can also be formed at a position where an emission area (LE) does not exist (e.g., the non-display area), and thus the non-bending area (FL) can be formed at the position corresponding to the display area. Therefore, a flexible display 100 capable of displaying an image more stably is provided.

The second and third exemplary embodiments will now be described in detail with reference to FIGS. 5 to 8. FIGS. 5 and 6 illustrate a flexible display 100 in which a plurality of protrusions 114 are formed in a bent area (BD) according to the second exemplary embodiment. FIGS. 7 and 8 illustrate a flexible display 100 in which a plurality of grooves 116 are formed in a bent area (BD) according to the third exemplary embodiment.

As shown in FIGS. 5 and 6, the flexible display 100 in which the protrusions 114 are formed includes a window layer 110 and a flexible display panel 120 including the bent area (BD) and a non-bending area (FL). Since the window layer 110 and the flexible display panel 120 of the present exemplary embodiment correspond to those described above, a detailed description of such will be omitted. In the embodiment of FIGS. 5 and 6, the flexible display panel 120 can include an emission area (LE) through which light emitted from a unit pixel passes. In other words, the flexible display panel 120 includes the emission area (LE) in which an area of the flexible display panel 120 corresponding to the unit pixel is formed.

The bent area (BD) of the present exemplary embodiment is formed by partially removing the window layer 110. More specifically, as shown in FIGS. 5 and 6, the bent area (BD) is formed by removing an area of the window layer 110, other than an area of the window layer 110 corresponding to the protrusions 114, so that the protrusions 114 having a greater cross-section than that of the emission area (LE) of the flexible display panel 120 can be formed. For example, as shown in FIGS. 5 and 6, the width W1 of the protrusions can be greater than the width W2 of the emission areas (LE). In other words, the bent area (BD) of the present exemplary embodiment is formed by removing the window layer 110 so that the protrusions 114 remain after the removal.

As in the present exemplary embodiment, when the cross-section of the protrusion 114 is greater than that of the emission area (LE), light emitted from the emission area (LE) can be directly emitted without being refracted or dispersed. Accordingly, even when the flexible display 100 is bent, the optical characteristics thereof can be prevented from deteriorating. The protrusions 114 of the present exemplary embodiment can be formed to have substantially the same height as the thickness of the window layer 110, but they is not limited thereto, and the protrusions 114 can be formed to have height that is less than the thickness of the window layer 110. In addition, the bent area (BD) can be formed to have a shape as shown in FIGS. 5 and 6 by leaving a portion of the window layer 110 after removing some of the window layer 110 so that a lower portion of the protrusions 114 can be connected to the window layer 110.

A bent area filling portion or filler 132 is formed on a surface of the removed window layer 110. The bent area filling portion 132 is formed by filling the bent area (BD) so that the removed area of the window layer 110 may have substantially the same height and width as the surface of the window layer 110. The bent area filling portion 132 may completely cover the protrusions 114, but is not limited thereto, and when the protrusions 114 is formed to have substantially the same height as the surface of the window layer 110, a surface of the protrusions 114 can be exposed to the exterior of the surface of the bent area filling portion 132 even after the bent area (BD) is filled by the bent area filling portion 132.

Further, the flexible display panel 120 according to the present exemplary embodiment can include a hard coating layer 130 formed on the window layer 110 and the bent area filling portion 132. In the embodiment of FIGS. 5 and 6, the hard coating layer 130 can be formed of the same material as the bent area filling portion 132. As described above, the material forming the hard coating layer 130 can be flexible. Accordingly, the bent area filling portion 132 of the present exemplary embodiment can also be formed of the same material as the hard coating layer 130.

Since the bent area filling portion 132 is formed on an upper portion of the flexible display panel 120 corresponding to the emission area (LE), it can be formed of a transparent material including transparent synthetic resins or glass. Accordingly, the hard coating layer 130 of the present exemplary embodiment can also be formed of a transparent material.

As shown in FIGS. 7 and 8, a flexible display 100 in which the window layer 110 is partially removed so that a plurality of grooves 116 can be formed according to the third exemplary embodiment also includes a window layer 110 and a flexible display panel 120 including a bent area (BD) and a non-bending area (FL). Since the window layer 110 and the flexible display panel 120 of the present exemplary embodiment correspond to those described above, a detailed description therefor will be omitted.

In the embodiment of FIGS. 7 and 8, the bent area (BD) includes a plurality of grooves 116 formed by partially removing the window layer 110. The grooves 116 are formed by partially removing the window layer 110 to have a greater cross-section than that of the emission area (LE) of the flexible display panel 120. For example, as shown in FIGS. 7 and 8, the width W1 of the grooves 116 can be greater than the width W2 of the emission areas (LE). When the cross-section of the grooves 116 are greater than that of the emission area (LE), as in the present exemplary embodiment, light emitted from the emission area (LE) can be directly emitted to the exterior of the flexible display 100 without being refracted or dispersed, as in the second exemplary embodiment. Accordingly, even when the flexible display 100 is bent, its optical characteristics can be preserved.

The grooves 116 of the present exemplary embodiment are formed removing a portion of the window layer 110 formed at a position corresponding to the emission area (LE), but they are not limited thereto, and the grooves 116 can be formed by partially removing the window layer 110 in a thickness direction of the window layer 110. The flexible display 100 of the present exemplary embodiment can further include a hard coating layer 130 formed on the other surface of the window layer 110. Since the hard coating layer 130 of the present exemplary embodiment is formed on an upper portion of emission area (LE) of the flexible display panel 120, as in the hard coating layer 130 of the second exemplary embodiment, it can be formed of a transparent material including transparent synthetic resins or glass. The grooves 116 according to the present exemplary embodiment can be filled with the same material as the hard coating layer 130, so that the groove 116 becomes a filled groove 134.

When the filled grooves 134 are filled with the same material as the hard coating layer 130, since refraction or dispersion of light emitted from the emission area (LE) can be prevented by an interface surface between the filled grooves 134 and the hard coating layer 130, the optical characteristics of the flexible display 100 of the present exemplary embodiment can be maintained.

A flexible display 100 according to various exemplary embodiments has been described. According to the various exemplary embodiments, even when the flexible display 100 is bent, since stress due to the bending can be properly distributed, it is possible to prevent the flexible display from being damaged and maintain the optical characteristics thereof when being bent.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A flexible display, comprising:
a window layer including a bending area and a non-bending area; and
a flexible display panel formed over a surface of the window layer and including a plurality of emission areas through which light emitted from a unit pixel passes to an exterior of the flexible display to display an image, wherein at least a portion of the window layer is removed from the bending area, wherein the bending area includes a plurality of protrusions, each arranged at a position corresponding to and overlapping a respective emission area of the plurality of emission areas, wherein each of the protrusions has a greater cross-section in a width direction than that of a corresponding emission area of the plurality of emission areas, the width direction intersecting each of a thickness direction of the window layer and a direction of an axis about which the bending area is bendable, and the flexible display panel further includes a non-display area through which light is not emitted between adjacent emission areas of the respective emission areas, wherein the bending area further includes a filler formed over the protrusions such that the height of a region of the bending area in which the protrusions are located is substantially equal to that of other regions of the window layer, and wherein the flexible display further comprises a hard coating layer formed of the same material as the filler and formed over another surface of the window layer so as to oppose the flexible display panel.

2. The flexible display of claim 1, wherein the filler comprises a transparent synthetic resin or glass.

3. A flexible display, comprising:
a window layer including a bending area and a non-bending area;
a flexible display panel formed over a surface of the window layer and including a plurality of emission areas configured to pass light from a unit pixel therethrough to display an image; and
a hard coating layer formed on another surface of the window layer so as to oppose the flexible display panel,
wherein the bending area includes a plurality of grooves, each arranged at a position corresponding to and overlapping a respective emission area of the plurality of emission areas, wherein each of the grooves has a cross-section in a width direction that is greater than that of a corresponding emission area of the plurality of emission areas, the width direction intersecting each of a thickness direction of the window layer and a direction of an axis about which the bending area is bendable, and the flexible display panel further includes a non-display area through which light is not emitted between adjacent emission areas of the respective emission areas, and
wherein a filler comprising the same material as the hard coating layer fills in the grooves.

4. The flexible display of claim 3, wherein the hard coating layer is formed of a transparent synthetic resin or glass.

* * * * *